April 7, 1942.         M. L. NELSON         2,279,025
HEAT CONTROLLING SYSTEM
Filed Oct. 16, 1939
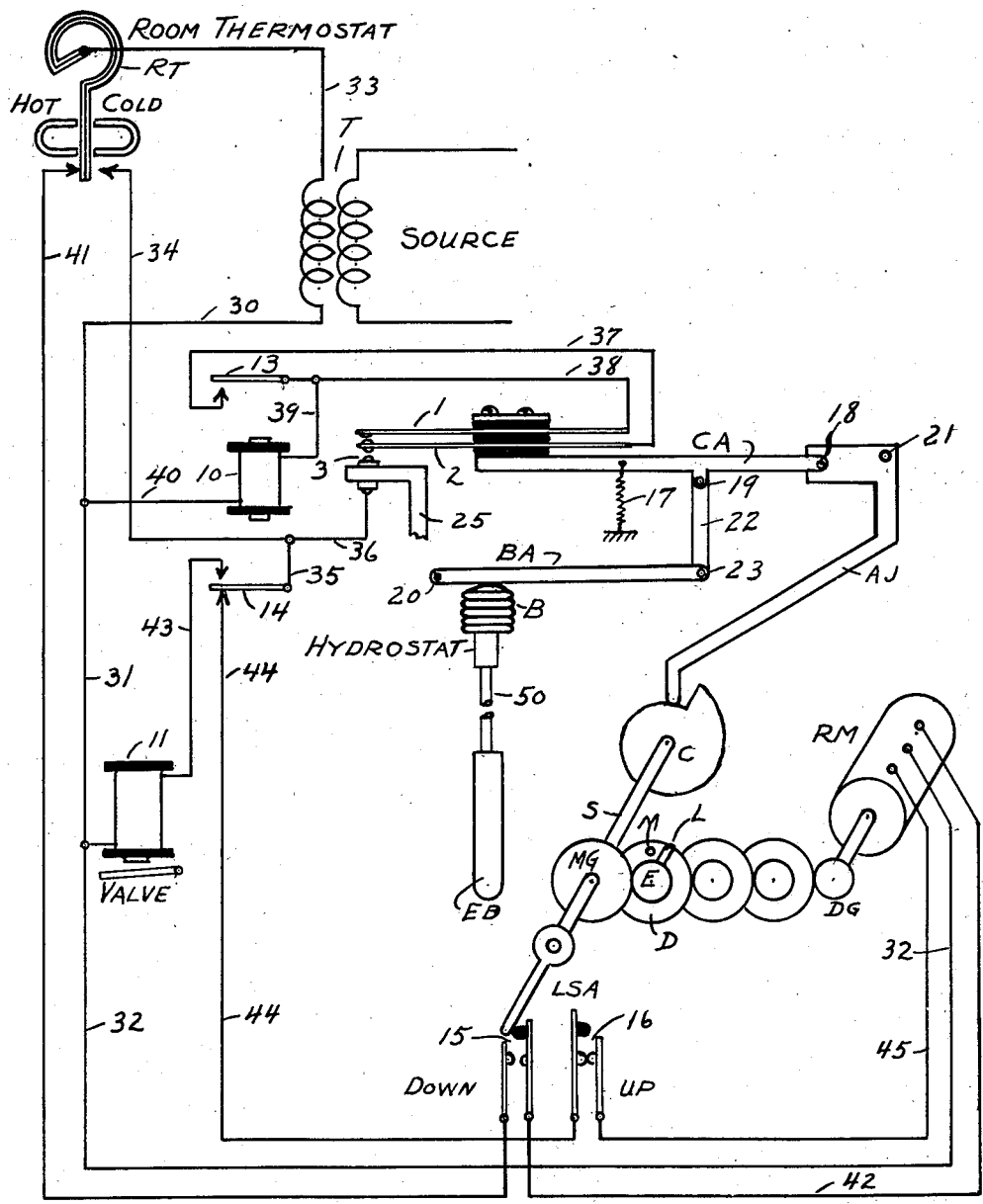
INVENTOR.
MARTIN L. NELSON
BY
ATTORNEY.

Patented Apr. 7, 1942

2,279,025

UNITED STATES PATENT OFFICE 2,279,025

HEAT CONTROLLING SYSTEM

Martin L. Nelson, Park Ridge, Ill.

Application October 16, 1939, Serial No. 299,660

13 Claims. (Cl. 236—9)

This invention relates to means for regulating heating systems in a manner to permit cooperation between a room thermostat and a hydrostat located at the heating medium for maintaining a constant desired room temperature without permitting the heating medium to overheat thereby allowing the room temperature to rise higher than is desired.

The main object of the present invention is the provision of improved means for maintaining a room temperature constantly within certain limits without permitting the heating medium to over-heat or under-heat which would allow the room temperature to become greater or less than the set limits.

One of the objects of the present invention is the provision of means whereby a room thermostat initiates the control of a time element mechanism and the heating medium and thereafter the heating medium hydrostat in cooperation with the time element mechanism directly and intermittently controls the heating medium until such time as a change occurs in the room thermostat.

Another object of the invention is the provision of means whereby the time element mechanism varies the positions in which the hydrostat has direct control of the heating medium.

A further object of the invention relates to the means whereby the relationship of the variable positions of the time element mechanism and the variable positions of the hydrostat is such that intermittent operations of the heating medium takes place under the joint control of the hydrostat, the time mechanism, and the thermostat to maintain a constant desired room temperature.

A further feature of the invention relates to the joint control of said heating medium by the room thermostat and time mechanism in combination with a hydrostat which renders said joint control effective or ineffective dependent upon the relative positions of said hydrostat and said timing mechanism.

Another feature relates to arrangements whereby the hydrostat, in accordance with the heat at the heating medium, changes the positions of the timing mechanism in which positions the timing mechanism effectively controls the heating medium.

Another feature relates to an improved arrangement whereby the heating medium is intermittently operated by the hydrostat and timing mechanism with a time interval between each operation to permit sufficient time for the room temperature to reach a temperature proportionate to the then prevailing temperature of the heating medium and weather conditions before the heating medium is again operated so that the room thermostat, by its operation or non-operation, determines if another heating operation should take place.

Another feature relates to the series of intermittent operations of the heating medium until the room thermostat cuts off the control for more heat and in which the last setting, or temperature reached by the heating medium in its last cycle operation of the series, determines the cut off temperature point of the heating medium for the first cycle operation of a subsequent series. In case a first series comprise only one cycle operation, then the same predetermined cut off temperature point for the first cycle operation of the next or second series is reestablished. If a third series comprises more than one cycle operation then a new predetermined first cycle cut off temperature point for the fourth series is established in accordance with the temperature reached on last cycle operation of the third series. Therefore, the temperature of the heating medium, at its first cycle cut-off point, goes no higher than the temperature previously reached on the last cycle operation of the preceding series. In this manner the heating medium is first operated to a point which previously gave satisfactory room temperature and then, after the interval provided, is additionally operated only in case the room thermostat calls for more heat.

The various features of novelty and invention will more fully appear from the detailed description taken in connection with the accompanying drawing where the preferred form of the invention is shown.

Referring to the drawing, RT indicates a well-known bi-metal room thermostat having a pair of the usual horseshoe magnets for snap action of the thermostat to the hot and cold side contacts. T indicates a transformer for supplying operating current for the motor and relay magnets. 10 indicates a relay having a pair of make contacts 13 and a set of make-break contacts 14, the armature contacts 13 and 14 being operated towards the relay magnet 10 when the latter is energized.

11 indicates, in its preferred form, a magnet for controlling the valve supplying the fuel to the heating medium (not shown) which may be any well-known hot water, steam, or gas heater.

If desired, 11 could also control the draft and damper controls of a hot air furnace.

Associated with the heating medium is a hydrostat comprising the bellows B, the controlling expansion bulb EB and the connecting tube 50. The expansion bulb EB is closely associated with the heating medium so that the temperature at the heating medium acts directly upon the fluid contained therein. As is well-known in the art, the temperature to which the expansion bulb EB is subjected causes variable vapor tension to be maintained within the bellows B, tube 50, and expansion bulb EB, all these parts being charged with the proper amount of volatile fluid suitable for the temperatures to which the hydrostat is to respond. The bellows B acts upon the bellows arm BA which is pivoted at 20 to raise and lower the right hand end of bellows arm BA in accordance with the expansion and contraction of bellows B. The bellows arm BA is pivotally connected at 19 and 23 by link 22 to the cam arm CA.

The arm BA, link 22, and arm CA is part of the time element mechanism which also includes the control contacts 1, 2 and 3, the adjusting arm AJ, limit switch arm LSA for controlling the down and up contacts 15 and 16, the reversible motor RM for operating the train of gears shown, the shaft S and the cam C. The motor RM is driven in a clockwise or counter-clockwise direction to rotate the driving gear DG, which through the associated gearing drives the gear D. The gear D is loosely mounted on its shaft and carries a pin M for engaging the arm L of pinion E to cause the rotation of the latter. The rotation of pinion E rotates the main gear MG, shaft S, limit switch arm LSA and cam C in a clockwise or counter-clockwise direction dependent upon the direction of rotation of the motor RM.

The cam C, as shown, has a gradually increasing diameter so as to lower or raise adjusting arm AJ about its pivot 21 so as to raise or lower the pivot point 18 of cam arm CA. The cam arm CA is pivotally connected to adjusting arm AJ at 18 and is pivotally interlinked to bellows arm BA by link 22. A spring 17 fastened to arm CA tends to lower the left hand end of arm CA whenever the variable pivot points 18 and 19 permit. A pair of insulated spring contacts 1 and 2 are mounted on the extreme left-hand end of cam arm CA and are operated into contact with each other and contact 3 by the spring 17 when the variable pivot points 18 and 19 are set in positions to permit such action. As will be easily understood from the drawing, the expansion and contraction of B raises and lowers arm BA and pivot point 19 through link 22 and in a similar manner cam C raises and lowers pivot point 18 since the arm AJ is pivotally mounted at 21. Contact 3 is insulatedly mounted in stationary bracket 25.

Since pivot points 18 and 19 of arm CA are variable, then it is obvious that contact 1, 2, and 3 are closed and opened under the joint control of the hydrostat and cam C in accordance with their variable settings.

One side of the transformer T is connected to relay 10, valve 11 and motor RM by way of conductors 30, 31 and 32 while the other side of the transformer T is connected to the room thermostat at which point it is branched through the hot and cold contacts to the various controlling contacts as shown.

It will now be assumed that the apparatus is in the positions shown in the drawing. The room thermostat hot contacts are closed thereby indicating that the room temperature is at its proper temperature, the valve circuit is open hence the valve 11 is closed, the main gear MG has been driven in a counter-clockwise direction until the point of arm AJ rests on the lowest point of cam C, the limit switch arm LSA has opened the down motor contacts 15, the contacts 1, 2, 3 are open, and the hydrostat bellows B is in the position shown. Since the valve 11 is closed, the temperature of the heating medium gradually lowers and therefore the hydrostat bulb B also gradually lowers bellows arm BA and cam arm CA and eventually closes contacts 2 and 3 and then 2 and 1 when the pivot point 19 is lowered sufficiently.

Assuming now that the room temperature is such as to call for more heat, in which case the thermostat will operate and close its cold contacts and open its hot contacts. In response to the closing of its cold contacts the thermostat RT completes the circuit for operating relay 10 as follows: from one terminal of transformer T, conductors 30 and 40, winding of relay 10, conductors 39 and 38, springs 1, 2 and 3, conductors 36 and 34, cold contacts of RT, and by way of conductor 33 to the other terminal of transformer T. Relay 10, upon energizing, at contacts 13, completes a locking circuit for itself independent of contact 1 as follows: T, conductors 30 and 40, relay 10, conductor 39, contacts 13, conductor 37, contacts 2 and 3, conductors 36 and 34, cold contacts of RT, and conductor 33 to T.

At back contacts 14 relay 10, upon energizing, opens a point in the motor RM circuit and at its front contacts completes the circuit for operating the valve magnet 11 as follows: from transformer T, conductors 30 and 31, winding of magnet 11, conductor 43, front contact 14, conductors 35 and 34, cold contact RT, and conductor 33 to transformer T. The magnet 11 in any well-known manner operates to open the valve for the heating medium or controls apparatus to start the heating operation of the heating medium.

As the heat increases at the heating medium the pressure in the expansion bulb increases thereby causing corresponding expansion in the bellows B. The expansion of bellows B gradually raises the right-hand end of bellows arm BA. Due to the pivoted link 22 the cam arm CA is pivoted about pivot 18 causing the gradual raising of the left-hand end of arm CA with the result that in a predetermined point of bellows B the spring contact 1 separates from contact 2 thereby opening the original energizing circuit of relay 10 but this relay is maintained for a short interval over its previously traced locking circuit through contacts 2 and 3. A further expansion of bellows B causes contacts 2 and 3 to separate thereby opening the locking circuit of relay 10 which accordingly deenergizes to open the circuit to valve 11 at front contacts 14 and to close the circuit for motor RM through back contacts 14 as follows: transformer T, conductors 30, 31 and 32, through the motor winding to cause clockwise rotation of motor RM, conductor 45, up spring contacts 16, conductor 44, back contacts 14, conductors 35 and 34, cold contacts RT and conductor 33 to transformer T. The opening of magnet 11 closes the valve to cut-off the fuel to the heating medium or prevents further heating of the heating medium in any well-known manner. The operation of the motor RM in a clockwise direction rotates its gear train thereby causing the pin M to engage arm L after a predetermined time dependent upon the speed of rotation of motor RM and the ratio of the chain of gears for driving gear D. In case the cold contact of RT is not opened at this point then further rotation of motor RM causes the rotation of pinion E which in turn rotates the main gear MG shaft S, cam C and limit switch arm LSA in a clockwise direction. The rotation of limit switch arm LSA in a clockwise directon closes the down limit contact springs 15 which are without effect at this time since the hot contacts of RT are open. The rotation of cam C in a clockwise direction raises the lower point of arm AJ thereby gradually raising the right-hand end of arm CA, since arm AJ is pivoted at 21. As cam C rotates pivot point 18 of arm CA is gradually raised until such time as spring contacts 1, 2 and 3 are closed. Since the other pivot point 19 of cam arm CA is raised and lowered by bellows arm BA under control of the bellows B it will be seen that the closure and opening of contacts 1, 2 and 3 are dependent upon the relative positions of pivot points 18 and 19 of arm CA.

The closure of contacts 1, 2 and 3 again complete the circuit for energizing relay 10 which, upon operating, again locks and again operates valve magnet 11 over the circuit previously described. This reoperation of relay 10 at back contacts 14 opens the circuit to motor RM which stops further rotation of the gear train and cam C. The operation of valve magnet 11 again causes the heating medium to increase its temperature thereby causing further expansion of the bellows B. When the bellows B expands it raises arm BA and link 22 to raise pivot point 19 of arm CA. Since the pivot point 18 is temporarily maintained in its last set position because the motor RM has stopped cam C, the gradual raising of pivot point 19 by the bellows B finally causes the separation of contacts 1, 2 and 3 with the result that relay 10 and valve magnet 11 release.

At back contacts 14 the motor circuit is again completed to cause the rotation of the motor RM in a clockwise direction thereby further rotating cam C in a clockwise direction to again gradually raise pivot point 18 of arm CA by means of arm AJ. The release of valve magnet 11 cuts off the fuel or checks further heating of the heating medium. As is well-known, the hydrostat bellows B may continue to expand for a short interval after magnet 11 releases because of the time lag of temperature rise on certain types of heating mediums. However, motor RM continues to rotate as long as cold contacts of RT are closed and eventually raises pivot point 18 a sufficient distance with relation to pivot point 19 to again close contacts 1, 2 and 3.

The reclosure of contacts 1, 2 and 3 again causes the operation of relay 10 and magnet 11 and opens the motor circuit, the heating medium again causes further expansion of B until the contacts 1, 2 and 3 are again opened.

The opening of contacts 1, 2 and 3 again release relay 10 and magnet 11 to again rotate the motor until the contacts 1, 2 and 3 again close. These cycle of operations continue until such time as the room temperature reaches a point to cause the opening of the cold contacts and the closing of the hot contacts of the room thermostat.

It should be stated at this time that after the room temperature has once been heated to the desired temperature very few if any full cycle operations as just described are needed to maintain a proper temperature.

In case the cold contacts of RT continue closed the cycle operations are repeated until arm AJ rests on the highest point of cam C at which point the limit switch arm LSA opens contacts 16 to prevent further rotation of motor RM and cam C. In this position pivot 18 is raised to its highest point and since it can go no higher, this highest point determines the temperature point to which the heating medium can be operated to. That is, with 18 at its highest point and point 19 being raised by bellows B to a point to cause opening of contacts 1, 2 and 3 the circuit of relay 10 is maintained open to hold the circuit of magnet 11 open thereby preventing further heating. This point of operation is very seldom if ever reached and has been provided only as a safety measure to prevent overheating to a dangerous point.

From the foregoing description it will be seen that as long as the cold thermostat contacts are closed the heating medium is intermittently operated to raise the temperature by cycle operations under the joint control of the heating medium hydrostat and the timing device such as the motor RM and associated mechanism and that the timing device allows a delay so as to enable the room temperature to reach a point proportionate to the temperature of the heating medium and prevailing weather conditions before another cycle operation takes place.

As soon as the room reaches the desired temperature, the room thermostat RT operates to open its cold contacts and close its hot contacts. This operation may take place at any point in the cycle of operations previously described. In case the cold contacts open at a time when relay 10 and valve magnet 11 are energized then relay 10 and magnet 11 are immediately released, magnet 11 closing the valve to cut off the supply of fuel or to shut the draft and open the check as the case may be. Relay 10 releases in this case regardless of the position of contacts 1, 2 and 3 and since the cold contacts are opened the motor circuit for driving the motor in a clockwise direction is likewise opened with the result that the motor is stopped. However, the closure of the hot contacts of the room thermostat closes a circuit for operating the motor RM in a counter-clockwise direction as follows: from transformer T, conductor 33, hot contacts of RT, conductor 41, down contacts 15, conductor 42, winding of motor RM, conductors 32, 31 and 30 to transformer T. Motor RM operates in a counter-clockwise direction thereby driving gear D and pin M until the pin M engages arm L of pinion E to thereby drive pinion E and main gear MG to rotate the shaft S, limit switch arm LSA, and cam C in a counter-clockwise direction. This operation continues until either the hot contacts open or until the limit switch arm LSA opens contacts 15 included in the motor circuit. The rotation of cam C in a counter-clockwise direction gradually lowers adjusting arm AJ thereby gradually lowering pivot point 18 of arm CA. Also during this time the bellows B has been gradually lowering arm BA to lower pivot point 19 of arm CA as previously described. The relative positions of these pivot points 18 and 19 may or may not be such as to close contacts 1, 2 and 3 at a time the hot contacts open and the cold contacts close. In case the contacts 1, 2 and 3 are open at the time the cold contacts close then the motor circuit for operating motor RM in a clockwise direction is reclosed. Also since the bellows B has been gradually lowering arm CA contacts 1, 2 and 3 will be closed either at the time the cold contacts close or very shortly thereafter with the result that contacts 1, 2 and 3 are reclosed to again complete the circuit for relay 10 to operate magnet 11 as previously described to restart the cycle operations until the room has reached the temperature to open the cold contacts and close the hot.

It has been found under actual working conditions that very seldom if ever more than one cycle operation takes place during normal weather conditions and that cam C, after once being set, is very seldom rotated in either direction since the hydrostat in cooperation with the room thermostat maintains the proper temperature in accordance with the set position of cam C, and cam C is only changed when there has been a change in the general outside temperature, it being remembered that before cam C can be changed the gear D must rotate far enough to cause pin M to engage arm L to rotate pinion E for each reversal of the motor. Since it therefore takes considerable time to reset cam C and thereby change pivot point 18, the hydrostat bellows B alone becomes effective to cut off the heating operation for the first cycle operation of a new series when the temperature remains fairly constant or when it is getting colder. Since cam C has not been changed by the time bellows B cuts off the first cycle of a new series of heating operations then it will clearly be seen that the heating medium is heated to its first cut-off point in this new series to the same cut-off point as previously reached in the last cut-off point of the series just proceeding this new series. The bellows B is first operated to exactly the same point as last previously reached to cut-off the first cycle heating operation when the room thermostat again calls for more heat within a predetermined time. Therefore the first cut-off point for the first cycle operation of a new series is always the same as the last cut-off point previously reached for the preceeding series in case the new series of cycle operations occur within a predetermined time. In other words, when heat is again called for within a predetermined time, the heating medium is first heated to the same point last reached which gave the desired room temperature and is only reheated in a second cycle operation after a predetermined time in case the room temperature does not reach the cut-off point.

From the foregoing it will be seen that the cut-off point for the first cycle heating operation of a new series is always the same as the cut-off point reached in the last cycle operation of the immediately preceding series of heating operations when it is getting colder outside or when it remains fairly constant. However, there are exceptions to the above and these exceptions occur when it is getting warmer outside and when a considerable time elapses before the thermostat again calls for heat.

For example, it will be assumed that the room thermostat does not call for heat for a considerable time. During this time the motor RM, as previously described, is operated for a sufficient time to cause the pin M on gear D to engage arm L and thereby rotate pinion E. The operation of pinion E rotates gear MG and shaft S to cause the rotation of cam C in an anti-clockwise direction. This rotation of cam C lowers arm AJ thereby gradually lowering pivot point 18 of arm CA. Also during this time the heating medium is not being heated with the result that the hydrostat bellows B is gradually contracting to lower arm BA and pivot point 19 of arm CA. Therefore, whenever sufficient time elapses between heating operations to cause the motor RM and cam C to change the position of pivot point 18, the cut-off point is gradually lowered and the cut-off point is then predetermined by the position of pivot 18 at the time the hot contacts open and the cold contacts close. The opening of the hot contacts stopping further rotation of cam C to maintain pivot 18 in the position last operated to.

In case it gradually gets warmer outside then the thermostat may never call for more heat or may do so only after a great lapse of time. Since, during this time the hot thermostat contacts are closed the motor RM rotates cam C to gradually lower arm AJ and pivot 18. The cut-off point to which it is necessary to heat the heating medium is gradually lowered as pivot point 18 is gradually lowered. Therefore, the cut-off point, in this case, is predetermined by the position reached by pivot 18 at the time the hot contacts of the thermostat open and the cold contacts close. In case the hot contacts of the thermostat do not open then as the motor RM continues to operate limit switch arm LSA opens down springs 15 to open the motor circuit to stop further rotation of the motor. The circuits and apparatus are now returned to the positions shown in the drawing and pivot point 18 is at its lowest possible position and therefore, the heating medium must be heated to its initial predetermined or lowest cut-off point as previously described.

Having described the invention, what is considered to be new and is desired to be protected by Letters Patent is set forth in the following claims.

What is claimed is:

1. In a heat controlling system, a space to be heated, a heating medium for heating said space, a thermostat operable in accordance with the temperature of said space, a relay, a circuit for said relay including contacts on said thermostat and a source of current, electromagnetic means for operating said heating medium, means associated with said heating medium and operable in accordance with the heat at the heating medium, contacts directly controlled by said last mentioned means for completing said relay circuit, contacts operated by said relay for energizing said electromagnetic means to operate said heating medium and a time element mechanism controlled by said thermostat for operating said directly controlled contacts dependent upon operated position of said last mentioned means.

2. In a heat controlling system, a space to be heated, a heating medium for heating said space, a thermostat operable in accordance with the temperature of said space, means associated with said heating medium and operable to variable positions in accordance with the heat at the heating medium, a time element mechanism associated with said last mentioned means and operable to variable positions under control of said thermostat, a relay, a circuit for said relay including contacts on said thermostat and a source of current, contacts controlled in accordance with the variable positions of said time element mechanism and the variable positions of said last mentioned means for intermittently completing said relay circuit to intermittently energize and deenergize said relay, electromagnetic means for operating said heating means to maintain said space at a desired temperature, and contacts operated by said relay for controlling the operation of said electromagnetic means.

3. In a heat controlling system, a space to be heated, a heating medium for heating said space, means for intermittently operating said heating medium in a series of heating operations to heat said space, means for stopping said series of heating operations in response to the temperature of said space reaching a predetermined value, means effective in response to the operation of said stopping means for predetermining the point at which the first heating operation of a following series of heating operations is to be interrupted, a motor rotated in one direction during each series of heating operations to control said intermittently operated means until the temperature of said space reaches said predetermined value, said motor thereafter rotated in the reverse direction between each series of heating operations in response to the operation of said stopping means, and means for altering the point at which the first heating operation of a following series of heating operations is to be interrupted only in case said motor makes a predetermined plurality of revolutions in the reverse direction before a new heating operation starts.

4. In a heat controlling system, a space to be heated, a heating medium for heating said space, means for intermittently operating said heating medium in a series of heating operations to heat said space, means for stopping said series of heating operations in response to the temperature of said space reaching a predetermined value, means effective in response to the operation of said stopping means for predetermining the point at which the first heating operation of a following series of heating operations is to be interrupted, a motor operated in response to the operation of said stopping means, and means operative by said motor only after a predetermined plurality of motor revolutions for gradually changing the points at which the first heating operation of a following series of heating operations is to be interrupted in proportion to the lapse of time after said predetermined plurality of motor revolutions and the start of the said following series of heating operations.

5. In a heat controlling system, a space to be heated, a heating medium for heating said space, means for intermittently operating said heating medium in a series of cycle operations to heat said space, means for stopping said series of cycle operations in response to the temperature of said space reaching a predetermined temperature, means for establishing a definite cut-off point for said heating medium in response to the operation of said stopping means, means for starting a new series of cycle operations to operate said heating medium in response to the temperature of said space reaching another predetermined temperature, and means whereby said heating medium in the first cycle operation of a new series is only operated to the same said established cut-off point as reached in the last cycle operation of the preceding series of cycle operations.

6. In a heat controlling system, a space to be heated, a heating medium for heating said space, means for operating said heating medium to heat said space, a time element mechanism, means for operating said time element mechanism to intermittently operate said means in a series of cyclic operations to provide a time interval between each heating operation of said heating medium, means for stopping said series of cycle operations in response to the temperature of said space reaching a predetermined temperature, means for establishing a definite cut-off point for said heating medium in response to the operation of said stopping means, means for starting a new series of intermittent cycle operations to intermittently operate said heating medium in response to the temperature of said space reaching another predetermined temperature, and means whereby said heating medium is always operated in the first cycle operation of a new series to only the same said established definite cut-off point as reached in the last cycle operation of the preceding series of cycle operations.

7. In a heat controlling system, a space to be heated, a heating medium for heating said space, means including a timing device for intermittently operating said heating medium to heat said space in a series of heating operations interposed with a time interval between each heating operation, means for stopping said series of heating operations in response to the temperature of said space reaching a predetermined value, means effective in response to the operation of said stopping means for predetermining the point at which the first heating operation of a following series of heating operations is to be interrupted, a motor operated in response to the operation of said stopping means, and means operative by said motor only after a predetermined plurality of motor revolutions for operating said timing device to render said last predetermining means ineffective and for thereafter changing the points at which the first heating operation of a following series of heating operations is to be interrupted in accordance with the lapse of time after said predetermined plurality of motor revolutions and the start of said following series of heating operations.

8. In a heat controlling system, a space to be heated, a heating medium for heating said space, a contact arm, a bellows arm pivoted at one end, a connecting link pivoted to the free end of said bellows arm and to said contact arm, a timing arm pivoted near its center, one end of said timing arm pivotally connected to one end of said contact arm, a bellows directly controlled by the heat at the heating medium for raising and lowering the free end of said bellows arm and said connecting link thereby pivoting said contact arm at said one end to raise and lower the other end of said contact arm in accordance with the temperature at the heating medium, timing means associated with said timing arm for raising and lowering said one end of said timing arm to vary the positions of said one end of said contact arm with respect to said connecting link and bellows arm and for pivoting said contact arm at said connecting link to raise and lower said other end of said contact arm, means for controlling said heating medium, and circuit means including contacts controlled by the raising and lowering of said other end of said contact arm for controlling said heat controlling means and said timing means.

9. In a heat controlling system, a space to be heated, a heating medium for heating said space, a thermostat operable in accordance with the temperature of said space, an arm having two pivot points, one end of said arm being free to move, the other end of said arm being the first of said pivot points and the second pivot point being located between the ends of said arm, means controlled by the heat produced at said heating medium for raising and lowering said second pivot point to pivot said arm at said first pivot to raise and lower the free end of said arm to variable positions, timing means for raising and lowering said first pivot point to pivot said arm at said second pivot point to raise and lower the free end of said arm to variable positions, means for controlling said heating medium, and circuit means including contacts on said thermostat and contacts controlled by the free end of said arm in its variable positions for controlling said heat controlling means and said timing means.

10. In a heat controlling system, a space to be heated, a heating medium for heating said space, electromagnetic means for controlling said heating medium, a circuit for said electromagnetic means, a thermostat having contacts operable in accordance with the temperature of said space, a relay, a circuit for said relay including said thermostat contacts and a source of current connected to said thermostat contacts, heat responsive means associated with said heating medium and operable in accordance with the heat at said heating medium, contacts directly controlled by said heat responsive means for completing said relay circuit, contacts operated by said relay and said thermostat contacts completing said electromagnetic means circuit for operating said electromagnetic means to operate said heating medium, a time element mechanism also controlling said directly controlled contacts alternately with said heat responsive means, and a circuit for said time element mechanism including said thermostat contacts and contacts controlled by said relay whereby said heating medium and said time element mechanism are intermittently and alternatively operated under control of said relay and thermostat contacts, and said relay is operated under control of said thermostat and said directly controlled contacts.

11. In a heat controlling system, a space to be heated, a heating medium for heating said space, a thermostat operable in accordance with the temperature of said space, heat responsive means operable in accordance with the temperature at said heating medium, a relay for controlling the operation of said heating medium, contacts for controlling the operation of said relay in case said thermostat is calling for more heat to thereby operate said heating medium, means directly operated by said heat responsive means in response to an increase in temperature at said heating medium for opening said contacts to release said relay, a time element mechanism, means for stopping further increase in temperature of said heating medium and for operating said time element mechanism in response to the release of said relay, means directly operated by said mechanism after a predetermined time for reclosing said contacts to reoperate said relay in case said thermostat is still calling for more heat, the reoperation of said relay stopping the operation of said mechanism and causing the reoperation of said heating medium whereby successive heating operations followed by successive timing cycles continue until said thermostat no longer calls for more heat, and contacts on said thermostat for preventing the operation of said relay in response to the temperature of said space reaching the desired point irrespective of the opened or closed condition of said first mentioned contacts.

12. In a heat controlling system, a space to be heated, a heating medium for heating said space, means for intermittently operating said heating medium to heat said space in a series of heating operations, means for stopping said series of heating operations in response to the space temperature reaching a predetermined value, means effective in response to the operation of said stopping means for predetermining the cut-off point at which the first heating operation of a following series is to be interrupted, a first gear train, a motor for driving said first gear train, a second gear train for altering said predetermined cut-off point, an arm on said second gear train, a pin on said first gear train adapted to drive said second gear train, said motor driving said first gear train and pin and said second gear train by means of said arm in one direction during each series of heating operations and driving said first gear train in the reverse direction between each series of heating operations, and means whereby the pin on said first gear train must make one full revolution in said reverse direction to reengage said arm on the second gear train to thereby operate said second gear train and change said predetermined cut-off point.

13. In a heat controlling system, a space to be heated, a heating medium for heating said space, means for intermittently operating said heating medium in a series of heating operations to heat said space, means for stopping said series of heating operations in response to the temperature of said space reaching a predetermined value, means effective in response to the operation of said stopping means for predetermining the cut-off point at which the first heating operation of a following series of heating operations is to be interrupted, a timing device operable predetermined distances in accordance with its length of time of operation, said timing device operated in response to the operation of said stopping means, and means for altering said predetermined cut-off point, said last means being normally ineffective in response to short time intervals of operation of said timing device, and said last means being effective only in case said timing device is operated a definite required distance corresponding to a definite predetermined extended time interval.

MARTIN L. NELSON.